Figure 1:
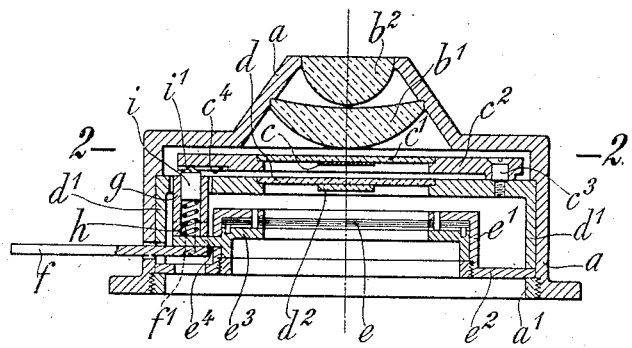

H. SIEDENTOPF.
MICROSCOPE CONDENSER.
APPLICATION FILED AUG. 31, 1914.

1,157,257.

Patented Oct. 19, 1915.

Witnesses:
Paul Krüger
Fritz Sander

Inventor:
Henry Siedentopf

UNITED STATES PATENT OFFICE.

HENRY SIEDENTOPF, OF JENA, GERMANY, ASSIGNOR TO THE FIRM OF CARL ZEISS, OF JENA, GERMANY.

MICROSCOPE-CONDENSER.

1,157,257.

Specification of Letters Patent.

Patented Oct. 19, 1915.

Application filed August 31, 1914. Serial No. 859,577.

*To all whom it may concern:*

Be it known that I, HENRY SIEDENTOPF, a citizen of the German Empire, residing at Jena, Germany, have invented a new and useful Microscope-Condenser, of which the following is a specification.

The invention relates to microscope condensers intended in the first place for the production of a dark-ground illumination by means of oblique peripheral pencils with the employment of central stopping, but which are so arranged that that part of the condenser, which during the dark-ground illumination is covered by the central stop, can be used in connection with an iris diaphragm, for light-ground illumination as well, after the dark-ground stop has been made inoperative. When using such condensers it is often desirable, to bring about the change in the kind of lighting as rapidly as possible, in order to be able to observe the object, which is examined chiefly in the dark ground, temporarily in the light ground with as little interruption as possible. This is of especial importance, when rapidly changing or moving objects are under examination, or in the case of microkinematographic work. Up to now it has been necessary, on this change from the dark-ground image to the light-ground image being made, to operate at least two independent handles, viz, one for rendering the dark-ground stop inoperative and one for closing the iris diaphragm down to the amount desired for the light-ground illumination, the change in the kind of image and the setting for a particular luminosity being thus inconvenient. It was therefore frequently necessary to put up with the disadvantage, that after the change had been effected, the object had already altered or the moving object had wandered out of the field of view and the like.

According to the invention this drawback may be almost entirely removed, by the handle serving for the setting of the iris diaphragm being also used for putting the dark-ground stop into and out of operation. The actuating means for putting the dark-ground stop into and out of operation will with advantage be coupled in such a manner with the handle serving for setting the iris diaphragm that, simultaneously with the putting out of operation of the dark-ground stop, the iris diaphragm is closed to about the amount which corresponds to the size of the dark-ground stop. The result so obtained is, that, when the dark-ground stop has been moved out of the field of view of the light-ground image, the iris diaphragm has already been closed so far that only those rays which are of use for the light-ground illumination can enter the condenser, and that the luminosity of the light-ground image may be directly adjusted by the further movement of the handle in the usual manner. As moreover with the light-ground illumination the luminosity of the image is considerably greater than with the dark-ground illumination and the eye would be dazzled on the rapid change of illumination taking place, it is to be recommended, to mount immovably in the path of the rays of that part of the condenser, which serves for the light-ground illumination, a light-absorbing disk corresponding in size to the dark-ground stop, the translucency of which disk is so chosen that, with the iris diaphragm in a position, in which only the part of the condenser serving for the darkground illumination is stopped, the ground of the light-ground image has about the same luminosity as the objects of the darkground image. The light-absorbing effect of the disk may be obtained in any suitable way, for instance, by making it of smoked, colored or mat glass or of a combination of such means.

The invention is applicable to all the usual systems of condensers, that are suitable for use in any of the above-mentioned cases, both to such as are adapted to be inserted in the sliding condenser-sleeve of the microscope, and to plate condensers, which are laid on the microscope table, and also to lens condensers, as well as to the various types of reflecting condensers. In the latter the central portion of the condenser is either to be left free or is to be provided with a one or two membered lens condenser corresponding to the size of the dark-ground stop, whereby, after rendering the darkground stop inoperative, the light-ground illumination is made possible either directly or through the interposition of the lens condenser. The handle may take any desired form, for instance that of a setting lever, a milled edged disk, mounted laterally or disposed concentrically with the condenser casing or some such arrangement.

In the annexed drawing there is shown as a constructional example of the invention a two-membered lens condenser with a dark-ground stop capable of being rotated to the side.

Figure 2:
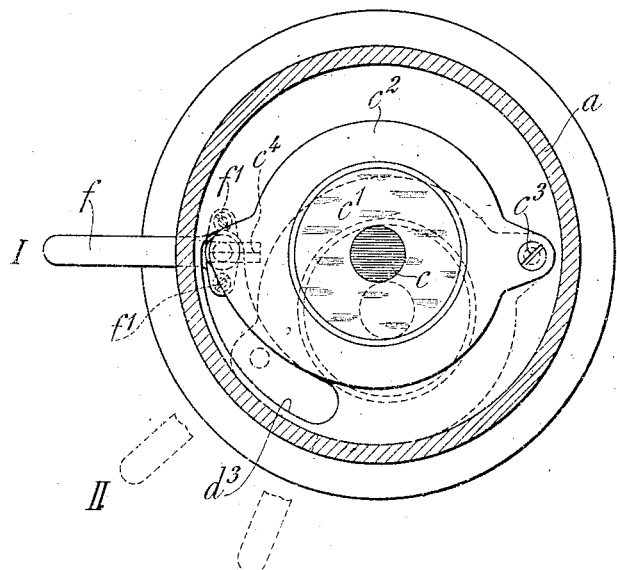

Figure 1 is a longitudinal section, Fig. 2 a cross-section on line 2—2 of Fig. 1.

In a condenser casing $a$ two condenser lenses $b^1$ and $b^2$ are mounted. In front of them and carrying the dark-ground stop $c$ there is first of all a glass plate $c^1$, which is rotatable along with a disk $c^2$ containing it about a fixed journal $c^3$, and a second glass plate $d$ fixed in the top of a box $d^1$, which is fitted in the condenser casing, and carrying in the middle a cemented on disk $d^2$ of smoked glass. As it is assumed, that parallel rays of light are transmitted to the condenser, this disk has the same size as the dark-ground stop $c$. There is further built into the condenser an iris diaphragm $e$, the mount $e^1$ of which is held by its flange $e^2$ along with the box $d^1$ by means of a screwed in ring $a^1$ in the condenser casing $a$. The movable ring $e^3$ of the iris diaphragm $e$ is rotated by means of a projecting piece $e^4$, which reaches through a slot in the mount $e^1$ and to which a setting lever $f$ reaching through corresponding slots in the condenser casing $a$ and the box $d^1$ is fixed by means of two screws $f^1$. The same screws $f^1$ fix to the projecting piece $e^4$ of the movable iris diaphragm ring $e^3$ a small box $g$ containing a catch $i$ having a cone-shaped point $i^1$, which catch is guided in the said box and is pressed upward by a helical spring $h$. In order to make a rotation possible, the top of the box $d^1$ has a slot $d^3$, in which the box $g$ can move. The catch $i$ engages by means of its point $i^1$ with a depression $c^4$ in a lateral flange of the disk $c^2$ and thus causes, on the setting lever $f$ being turned, the disk $c^2$ to be carried along with it, the said disk rotating about the journal $c^3$ and moving the dark-ground stop $c$ to the side.

With the setting lever $f$ in the position marked I in the drawing the condenser is set for dark-ground illumination, the iris diaphragm $e$ is quite open and the dark-ground stop $c$ is in its operative, central position. On the setting lever $f$ being turned into the position II, shown by dotted lines, the iris diaphragm $e$ closes down to the amount corresponding to the dark-ground stop $c$, and at the same time the said stop is rotated by the catch $i$ by about the amount of its diameter to the side, so that now the condenser is set for light-ground illumination. With this setting the disk $c^2$ occupies the position as shown in dotted lines in Fig. 2. The luminosity of the light-ground image is reduced by the smoked glass disk $d^2$, which thus becomes effective, by the above mentioned amount. On the setting lever $f$ being further turned from the position II into the position III, which is also shown in dotted lines, the iris diaphragm is gradually closed still further, while the catch $i$ slips, on account of its point $i^1$ being conical, out of the recess $c^4$ and slides over the disk $c^2$, so that the dark-ground stop remains in its turned-back position, without preventing the further setting of the iris diaphragm.

I claim:

1. In a microscope condenser adapted for both dark-ground illumination and light-ground illumination a central stop for use with the former kind of illumination, an iris diaphragm for use with the latter kind of illumination and a handle adapted to operate the said diaphragm and adapted also to render the said stop operative and inoperative.

2. In a microscope condenser adapted for both dark-ground illumination and light-ground illumination a central stop for use with the former kind of illumination, an iris diaphragm for use with the latter kind of illumination, a handle adapted to operate the said diaphragm and means for rendering the said stop operative and inoperative, comprising means for releasably coupling the diaphragm and the stop in such a manner that, on the stop reaching its inoperative position, the diaphragm aperture corresponds to the size of the stop.

3. In a microscope condenser adapted for both dark-ground illumination and light-ground illumination a central stop for use with the former kind of illumination, an iris diaphragm for use with the latter kind of illumination, a handle adapted to operate the said diaphragm and adapted also to render the said stop operative and inoperative, and a light-absorbing disk corresponding to the size of the stop, adapted to become operative on the stop becoming inoperative.

HENRY SIEDENTOPF.

Witnesses:
PAUL KRÜGER,
RICHARD HAHN.